United States Patent [19]

Hutchison

[11] Patent Number: 5,118,540
[45] Date of Patent: Jun. 2, 1992

[54] CORROSION RESISTANT FLEXIBLE REFLECTIVE FILM FOR SOLAR ENERGY APPLICATIONS

[75] Inventor: Joseph A. Hutchison, Dallas, Tex.

[73] Assignee: Solar Kinetics, Inc., Dallas, Tex.

[21] Appl. No.: 512,478

[22] Filed: Apr. 23, 1990

[51] Int. Cl.$^5$ .................... B32B 7/12; B32B 15/08
[52] U.S. Cl. .................... 428/40; 428/174; 428/212; 428/216; 428/337; 428/343; 428/352; 428/421; 428/458; 428/463; 359/360
[58] Field of Search .............. 428/458, 463, 913, 336, 428/421, 343, 352, 337, 174, 212, 216, 40; 427/164; 156/336, 326, 329, 332, 330; 350/1.7

[56] References Cited

U.S. PATENT DOCUMENTS

| | | | |
|---|---|---|---|
| 3,290,203 | 12/1966 | Antonson et al. | 350/1.7 |
| 3,645,834 | 2/1972 | McCaffrey | 428/421 X |
| 3,681,179 | 8/1972 | Theissen | 156/336 X |
| 4,226,910 | 10/1980 | Dahlen et al. | 428/336 |
| 4,288,493 | 9/1981 | Kropp | 428/913 X |
| 4,307,150 | 12/1981 | Roche | 428/463 X |
| 4,338,377 | 7/1982 | Beck et al. | 427/164 |
| 4,484,568 | 11/1984 | Witt | 427/164 |
| 4,645,714 | 2/1987 | Roche et al. | 428/458 |

OTHER PUBLICATIONS

"Review The Science of Adhesion", Journal of Materials Science 15 (1980), pp. 2141-2166.

*Primary Examiner*—Thomas J. Herbert, Jr.
*Attorney, Agent, or Firm*—Crutsinger & Booth

[57] ABSTRACT

Highly weather and corrosion resistant flexible reflective films for solar energy applications and lighting reflectors are formed by vapor-depositing silver onto a flexible support sheet, e.g., biaxially oriented polyester film and adherently bonding a protective fluorocarbon film, e.g., poly(vinyl fluoride), poly(vinylidine fluoride), or poly(tetrafluoroethylene), to the surface of the silver distal to the flexible support sheet with a layer of adhesive. Fluorocarbon film is highly optically transmissive to visible, ultraviolet, and/or near infra-red light between about 300-2,500 nanometers, stable to ultraviolet light, impervious to moisture, non-hygroscopic, scratch resistant, and easy to keep clean. The adhesive is highly optically transmissive to light between about 300-2,500 nanometers and stable to ultraviolet light. Chemical corrosion inhibitors and UV absorbers incorporated into the flexible reflective film can increase its resistance to corrosion and degradation by ultraviolet light.

26 Claims, 3 Drawing Sheets

CORROSION RESISTANT FLEXIBLE REFLECTIVE FILM FOR SOLAR ENERGY APPLICATIONS

TECHNICAL FIELD

This invention relates to flexible reflective films and methods of forming and using flexible reflective films. More particularly this invention relates to flexible reflective films that are corrosion resistant so that the films can be used for solar energy applications and lighting reflectors.

BACKGROUND OF THE INVENTION

The problem is to create an efficient flexible reflective film that is stable, corrosion resistant, and weather resistant. The reflective film must be flexible so that it can be used in a variety of configurations for solar energy applications, lighting reflectors, etc. To be efficient a reflective film must be highly specularly reflective to visible, ultraviolet, and/or near infra-red light between about 300–2,500 nanometers. It cannot be degraded by the high energy ultraviolet light emitted by the sun and conventional lamps. The reflective film must be dimensionally stable when exposed to weathering forces, so that the optical properties are preserved. Therefore, it must be impervious to moisture and have a low coefficient of hygroscopic expansion. The reflective film should be scratch resistant and resistant to the accumulation of dust and dirt on the surface. These characteristics would help preserve the optical properties of the reflective film under adverse conditions and lower the maintenance costs associated with cleaning the reflective surface. Preferably, the reflective film should also be low cost.

Attempts have been made to make such a film. For example, U.S. Pat. No. 4,307,150 describes the use of a painted layer of an interpolymer of certain acrylate and/or methacrylate copolymers to protect an opaque aluminum surface vapor deposited on a flexible polyester support sheet. The acrylate interpolymer paint is disclosed as about 5 g/m² (0.3 mil) thick. The polyester support sheet consists of a biaxially oriented polyethylene terephthalate lamina containing conventional slip agents and therefore having a mildly irregular surface to facilitate winding and a second polyethylene terephthalate lamina containing no slip agents and therefore having an exposed surface which is essentially optically smooth.

The patent speculates that silver or other metals could be substituted for aluminum. It does not describe how this could be accomplished. Silver reflects visible light better than aluminum. The pure metals respectively reflect approximately 98% and 91% of the light striking their surface. When incorporated in structures of the type described in U.S. Pat. No. 4,307,150, the effective reflectivity is reduced by the presence of the protective coating, viz, to approximately 95% for silver and 85% for aluminum.

The 10% greater reflectivity of silver compared to aluminum in solar reflectors is significant, since the major cost of such reflectors resides in the hardware itself, rather than in the reflective metal foil that is incorporated into the hardware. In lighting fixtures the 10% difference in reflectivity is repeatedly multiplied as light from the lamp in the fixture reflects and rereflects off the surfaces. Therefore, utilizing a lighting reflector incorporating silver as opposed to one incorporating aluminum results in perhaps a 35–50% gain in effectiveness.

Although silver reflects visible light better than aluminum, incorporating silver in structures described in U.S. Pat. No. 4,307,150 presents major problems. For example, silver, compared to aluminum, is more susceptible to corrosion (including the well-known tarnishing). Pin holes present in an acrylate paint coating or openings along the peripheral portions of the metal-coated support sheet allow corrosive materials to reach the reflective surface. Furthermore, acrylate coating is hygroscopic and the invading moisture subjects the reflective metal to additional corrosion.

In addition, a thin layer of silver, unlike a thin layer of aluminum, is characterized by the presence of a spectral "window" through which ultraviolet light in the 300–400 nanometer region readily passes. The transmission of this light peaks at approximately 325 nanometers. Both the sun and conventional lamps emit ultraviolet light in this frequency range.

The ultraviolet light that passes through the silver causes the polyester support sheet behind the silver to degrade, releasing small bubbles of carbon dioxide gas. Since the gas cannot escape through the protective acrylate coating, it moves inward, causing bubbles in the adhesive that attaches the flexible reflective film to a rigid support. These bubbles impart a "chicken skin" appearance that reduces the optical and aesthetic qualities of the film. Roche et al., U.S. Pat. No. 4,645,714. Thus the structure described in U.S. Pat. No. 4,307,150 wherein silver is substituted for aluminum could not be used for an efficient weather resistant reflective film.

Incorporating corrosion inhibitors and/or UV absorbers in the protective acrylate coating does not solve the problems associated with using silver as a reflective material. Corrosion inhibitors ameliorate the corrosion problem, but they frequently impart an unacceptable color. UV absorbers placed in the acrylate coating to protect the polyester support sheet against degradation ameliorate the degradation of the polyester problem, but they frequently exacerbate the corrosion of the silver. Substituting other polymers for the polyester support sheet is possible, but biaxially oriented polyester is generally structurally superior. Many other polymers are also susceptible to UV degradation.

U.S. Pat. No. 4,645,714 proposes the use of corrosion inhibitors and UV absorbers in separate layers of acrylate interpolymer paint. The purpose of these separate layers is to keep the corrosive UV absorbers out of contact with the silver. The silver is first coated with a thin layer of acrylate interpolymer paint, about 1–4 g/m² (0.05–0.2 mil), containing corrosion inhibitors. Then the product is coated with a second thin layer of acrylate interpolymer paint, about 4–8 g/m² (0.2–0.4 mil) containing UV absorbers.

The first layer of acrylate interpolymer paint primarily functions as a vehicle for the corrosion inhibitor for the silver. The first layer can be thinner because its purpose is to place the dissolved corrosion inhibitors in contact with the surface of the silver. Corrosion inhibitor that does not bond with the silver atoms does not protect the silver and is wasted in a thicker layer.

The second layer of acrylate interpolymer paint is thicker, since its primary function is to serve as a physical barrier against the weathering elements. Its secondary purpose is to serve as a vehicle for the UV absorbers that should be kept away from the surface of the silver.

A single UV absorber does not protect the polyester from the entire 300-400 nanometer range. The UV absorbers are effective to reduce the degradation of the polyester support sheet if placed between the ultraviolet light source and the polyester. The UV absorbers do not need to be adjacent to the silver.

The products described in U.S. Pat. Nos. 4,307,150 and 4,645,714 regardless of the type of reflective metal employed would not be suitable for many solar energy and lighting reflector applications. The thin acrylate paint coatings weather poorly and quickly erode away. Where the product incorporates a polyester support sheet and a layer of silver, the product suffers from the problems with UV degradation. As the acrylate layer containing UV absorbers is diminished, ultraviolet light degrades the polyester support sheet.

Even where the product is situated such that it is not exposed to weathering forces, acrylate paint does not adequately protect the metallized polymeric support sheet from moisture. Acrylate is stable to ultraviolet light, and so it has been used as an outer protective paint coating. But it is also hygroscopic and subjects the metal to additional corrosion.

When moisture invades the protective acrylate, the adhesives, and/or structural polyester film, the differing coefficients of hygroscopic expansion combined with the coefficients of thermal expansion for the various materials used in the film produce compressive stress. The expansion of the protective layers with respect to the metallized support sheet stresses the adhesive between the two. When the adhesive fails the reflective film buckles causing tunnels between the protective layer and the metallized support sheet. These tunnels allow wicking of moisture through the reflective film. The added moisture causes more damage.

Furthermore, the thin layers of acrylate paint are easily scratched, which reduces the optical and aesthetic properties of the film. A thicker protective coating of acrylate yields a more durable reflector, but the thicker the acrylate paint or cast acrylate layer, the more susceptible it is to cracking, buckling, and tunneling. Therefore, a product with a thick acrylate coating is not flexible enough to be incorporated into dish, trough, or angular configurations. Finally, a thick coating of acrylate paint is expensive.

Protecting the silver surface with a paint creates the possibility of pinholes in the paint. Pinholes allow spots of corrosion to develop, which diminishes the aesthetic properties and the optical properties of the reflective film. The thickness of a paint is also difficult to control, and some portions of the reflective surface receive even less protection.

Beyond these factors, dust and dirt easily adheres to surface coatings of acrylate paint, and so the reflective surface must be cleaned frequently.

All these factors reduce the optical efficiency an aesthetic properties of the reflective surface. To a lesser extent, with the possible exception of UV degradation of a polyester support sheet used with silver, the same problems are encountered when aluminum or other reflective metals are substituted for silver.

SUMMARY

The present invention provides improved flexible reflective films that ar highly weather and corrosion resistant. The improvement also makes the reflective film more scratch resistant and less susceptible to becoming dusty or dirty. Because of these advantages, the improved flexible reflective films are more durable, more optically efficient, require less frequent cleaning, and are cheaper to maintain. Reflective films made with this invention are thus extremely useful when incorporated in solar energy applications and lighting reflectors.

In its most basic form, the present invention comprises a specularly reflective metal surface of silver bonded to a flexible support sheet, e.g., biaxially oriented polyester film. A protective fluorocarbon film, e.g., poly(vinyl fluoride), poly(vinylidine fluoride), or poly(tetrafluoroethylene), preferably in the range of 20-60 $g/m^2$ (1-3 mils thick), is firmly adherently bonded to the surface of the silver distal to the flexible support sheet with a layer of adhesive.

The fluorocarbon film is highly optically transmissive between about 300-2,500 nanometers, impervious to moisture, non-hygroscopic, scratch resistant, and easy to keep clean. The fluorocarbon film is superior to a paint or cast polymer protective layer because it is not susceptible to pinholes and the thickness is easier to control.

An adhesive is required because fluorocarbon film does not bond effectively to metal surfaces. The adhesive also must be highly optically transmissive to visible, ultraviolet, and/or near infra-red light between about 300-2,500 nanometers. The adhesive must be stable to ultraviolet light and/or stabilized against degradation by ultraviolet light With UV absorbers.

The addition of chemical corrosion inhibitors can increase the corrosion resistance of the improved flexible reflective films. By incorporating UV absorbers into the invention, the reflective films can also be made more resistant to degradation by ultraviolet light.

Another layer of adhesive may be applied to the back of the flexible support sheet distal to the reflective metal for applying the reflective film to another rigid or flexible support and adherently bonding it thereto. This adhesive is applied as a uniform coating of a normally tacky and pressure-sensitive adhesive, e.g., acrylic or silicone, or a thermal set adhesive, e.g. acrylic, ethylene vinyl acetate (EVA), or epoxy.

To protect the adhesive on the back of the reflective film prior to use, a conventional release liner such as a silicone-coated polyester film may be employed. The fluorocarbon film may also be protectively covered with a premask film, e.g., polyproplylene, prior to installation.

BRIEF DESCRIPTION OF THE DRAWINGS

These and other objects and advantages of this invention will become apparent from the following detailed description when read with reference to the accompanying drawings wherein.

DETAILED DESCRIPTION OF THE INVENTION

Figure 1:
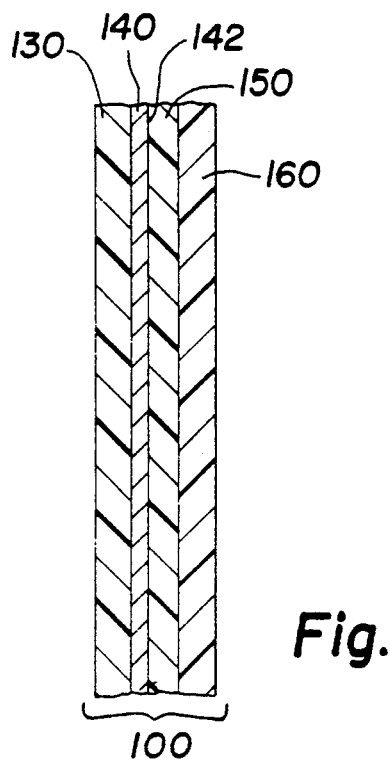
FIG. 1 is an enlarged cross-sectional view of one embodiment of the improved flexible reflective film of the present invention wherein fluorocarbon film protects the flexible reflective film.

Referring now to the drawings wherein like reference characters refer to like or corresponding parts throughout the figures.

FIG. 1 shows the one form of the improved flexible reflective film of the present invention generally described by the numeral 100. A thin layer of silver 140 is vapor deposited on the flexible support sheet 130 to produce a specularly reflective surface of silver 142. A layer of adhesive 150 bonds a protective layer of fluorocarbon film 160 to the surface of the silver 142. The protective fluorocarbon film 160 may be, for example, poly(vinyl fluoride) commercially available from DuPont under the trade designation "Tedlar," poly(tetraflouroethylene) commercially available from DuPont under the trade designation "Teflon," or poly(vinylidine fluoride) available from DuPont under the trade designation "Kynar". The fluorocarbon film 160 is preferably in the range of 20-60 g/m$^2$ (1-3 mils thick).

The fluorocarbon film is highly optically transmissive to visible, ultraviolet, and near-infrared light between about 300-2,500 nanometers, impervious to moisture, non-hygroscopic, scratch resistant, and easy to keep clean. The fluorocarbon film is superior to a paint or cast polymer protective layer because it is not susceptible to pinholes and the thickness is easier to control.

An adhesive is required because fluorocarbon film does not bond effectively to metal surfaces. The adhesive must be highly optically transmissive to visible, ultraviolet, and/or near infra-red light between about 300-2,500 nanometers. The adhesive also must be stable to ultraviolet light and/or stabilized against degradation by ultraviolet light with UV absorbers.

Figure 2:
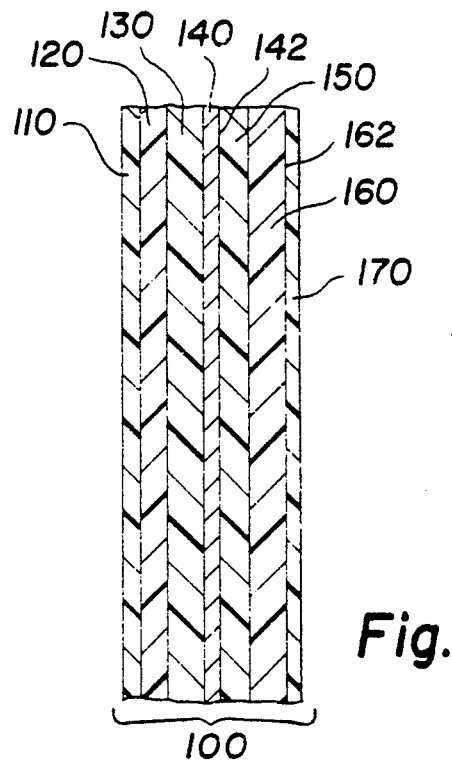
FIG. 2 is an enlarged cross-sectional view of a preferred embodiment of the improved flexible reflective film of the present invention.

Referring to FIG. 2 of the drawing, a more preferred embodiment of a flexible reflective film 100 is shown. A thin layer of silver 140 is vapor deposited on the flexible support sheet 130 to produce a specularly reflective surface of silver 142. A layer of adhesive 150 bonds a protective layer of fluorocarbon film 160 to the surface of the silver 142. A temporary layer of premask film 170 protects the exposed surface Of the fluorocarbon film 162 during shipping and during handling while the flexible reflective film 100 is being applied to a surface. Another layer of adhesive 120 is placed on the side of the flexible polyester support sheet 130 distal to the silver 140 so the flexible reflective film 100 may be adherently bonded to a surface. A layer of conventional release liner 110 temporarily protects the adhesive 120 prior to applying the flexible reflective film 100 to a surface.

Figure 3:
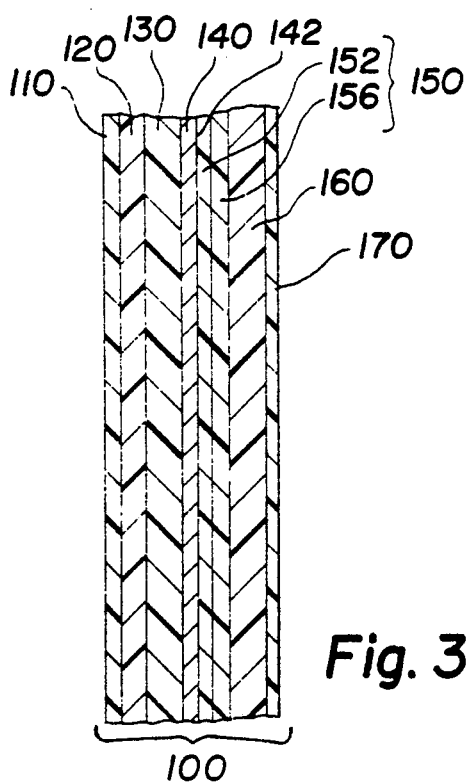
FIG. 3 is an enlarged cross-sectional view of another preferred embodiment of the improved flexible reflective film of the present invention wherein corrosion inhibitor and UV absorbers are contained in separate layers between the silver surface and the protective fluorocarbon film.

Referring to FIG. 3 of the drawing, another preferred embodiment of a flexible reflective film 100 is shown. A thin layer of silver 140 is vapor deposited on the flexible support sheet 130 to produce a specularly reflective surface of silver 142. The adhesive 150 bonding the fluorocarbon film 160 to the surface of the silver 142 is applied in two separate layers of adhesive 152 and 156. The adhesive layer 152 adjacent to the silver surface 142 contains corrosion inhibitor, and the adhesive layer 156 adjacent to the protective layer of fluorocarbon film 160 contains UV absorber. A layer of adhesive 120 is applied to the surface of the flexible polyester support sheet 130 distal from the silver layer 140 so the flexible reflective film 100 may be adherently bonded to another surface. A layer of conventional release liner 110 temporarily protects the adhesive 120 prior to applying the flexible reflective film 100 to a surface. A temporary layer of premask film 170 protects the exposed surface of the fluorocarbon film 160 during shipping and during handling while the flexible reflective film 100 is being applied to a surface.

Figure 4:
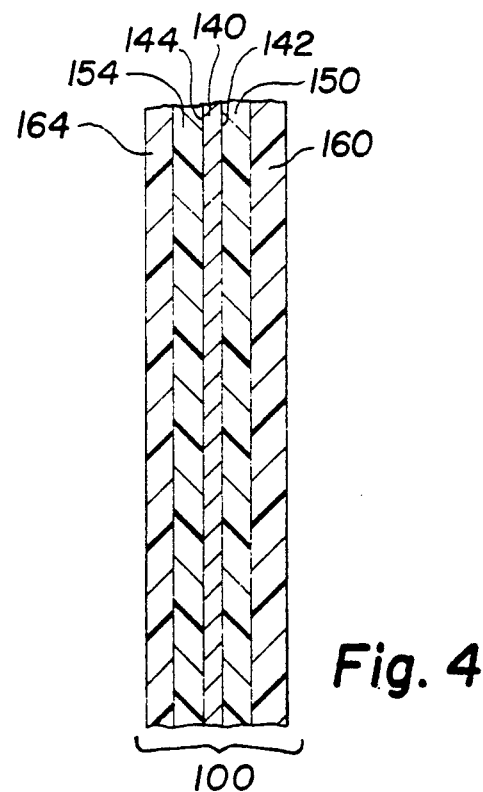
FIG. 4 is an enlarged cross-sectional view of another embodiment of the improved flexible reflective film wherein the film is reflective from both directions.

Referring to FIG. 4 of the drawing, another embodiment of a flexible reflective film 100 is shown. In this embodiment, the fluorocarbon film layers 160 and 164 serve as both a protective film and a flexible support sheet. Vapor deposited silver does not adequately adhere to the fluorocarbon film, therefore, two layers of adhesive 150 and 154 are required to bond the structure together. The silver layer 140 is vapor deposited onto one of the adhesive layers 150 or 154 after the adhesive layer has been applied to the fluorocarbon film 160 or 164. Since the fluorocarbon film is also used as a flexible support sheet, the combined thickness of the two fluorocarbon film layers 164 and 160 must be sufficient to provide structural support to reflective film 100. The thicknesses of fluorocarbon film layers 160 and 164 do not have to be equal if fluorocarbon film 164 is primarily intended to serve as the flexible support sheet and the fluorocarbon film 160 is primarily intended as a protective layer for the silver. As an added benefit to using fluorocarbon film as the flexible support sheet, the reflective film 100 of this embodiment is reflective from both surfaces of the silver 142 and 144.

Figure 5:
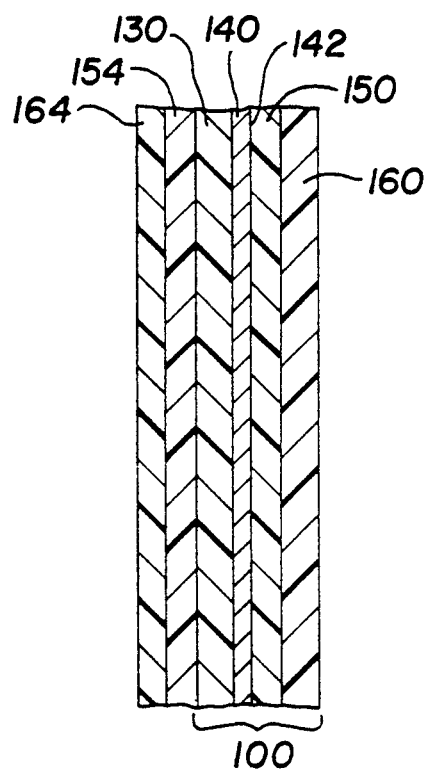
FIG. 5 is an enlarged cross-sectional view of another preferred embodiment of the improved flexible reflective film wherein the flexible support sheet, adhesives, and reflective silver are protected from both directions by fluorocarbon film.

Referring to FIG. 5 of the drawing, another preferred embodiment of a flexible reflective film 100 is shown. In this embodiment, two layers of fluorocarbon film 160 and 164 protect the flexible reflective film from both directions against weathering and moisture. A thin layer of silver 140 is vapor deposited on the flexible support sheet 130 to produce a specularly reflective surface of silver 142. A layer of adhesive 150 bonds a protective layer of fluorocarbon film 160 to the surface of the silver 142. Another layer of adhesive 154 bonds another layer of fluorocarbon film 164 to the surface of the flexible support sheet 130 distal to the silver 140.

The layers of protective fluorocarbon film 160 and 164 may be, for example, poly(vinyl fluoride) commercially available from DuPont under the trade designation "Tedlar," poly(tetraflouroethylene) commercially available from DuPont under the trade designation "Teflon," or poly(vinylidine fluoride) available from DuPont under the trade designation "Kynar". The two layers do not have to be the same type of fluorocarbon. The layers of fluorocarbon film 160 and 164 are preferably in the range of 20-60 g/m$^2$ (1-3 mils thick).

Figure 6:
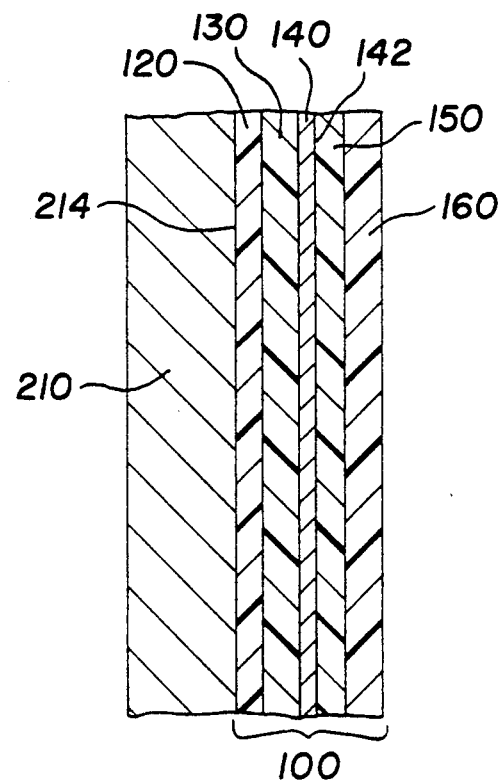
FIG. 6 is an enlarged cross-sectional view of a preferred embodiment of the improved flexible reflective film of the present invention adherently applied to a support surface.

Referring to FIG. 6 of the drawing, a preferred embodiment of a flexible reflective film 100, similar to FIG. 2, is bonded to a flat, curved, and/or angular surface 214 of a support structure 210. The flexible reflective film 100 has a layer of adhesive 120 for bonding the flexible reflective film 100 to the surface 214. A thin layer of silver 140 is vapor deposited on the flexible polyester support sheet 130 to produce a specularly reflective surface of silver 142. A layer of adhesive 150 bonds a protective layer of fluorocarbon film 160 to the surface of the silver 142.

Figure 7:
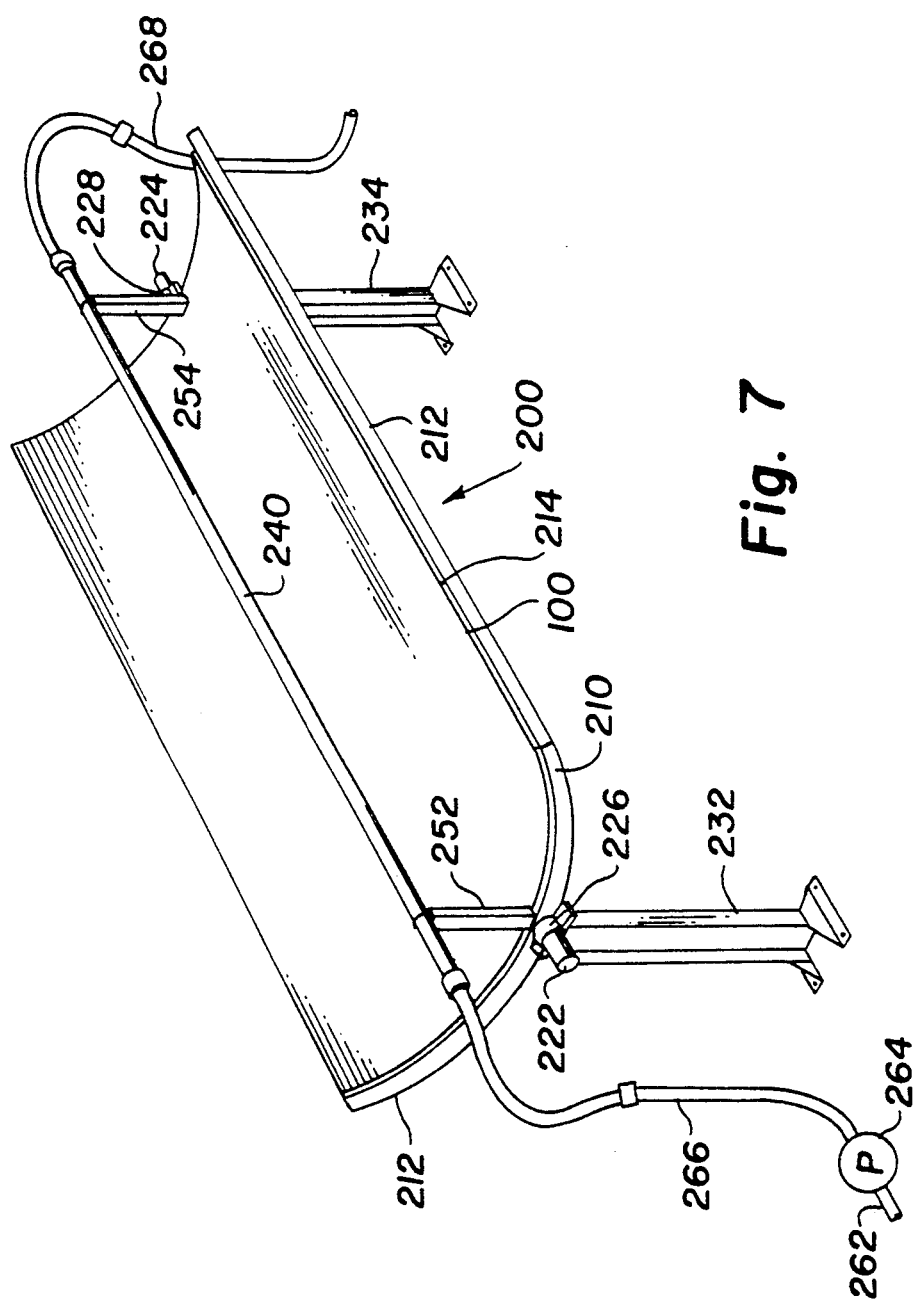
FIG. 7 is a perspective view, partially schematic, of a parabolic trough type solar energy concentrator incorporating the improved flexible reflective film of the present invention.

FIG. 7 schematically depicts a parabolic trough type solar energy concentrator designated generally as 200 incorporating the flexible reflective film 100 in reflector element 210. Reflector element 210 is mounted for rotational movement about a horizontal axis defined by mounting shafts 222 and 224 journaled in bearings 226 and 228 of mounting pylons 232 and 234. The mounting pylons 232 and 234 are anchored to the ground or other suitable base structure. Through movement about its horizontal axis the reflector element 210 may be oriented to receive maximum solar radiation at all times.

Reflector element 210 may comprise support structure 212, which may be either solid or framework, holding a surface 214 configured in a trough like shape. Adherently bonded to the surface 214 is the flexible reflective film 100. Thus, when the reflector is oriented toward the sun, solar radiation impinging on any part of the surface of the flexible reflective film 100 is reflected to converge at the line of focus of that parabolic surface.

A thermal treatment chamber such as receiver tube 240 is supported in the line of focus area of the concentrator by support struts 252 and 254. In the example shown, receiver 240 is hollow and adapted to act as a thermal treatment chamber for material being moved continuously through the receiver. Material for treatment in receiver 240 is drawn from a source, not shown, through supply line 262. The material to be treated is then moved through tubing 266 by pump 264 into and through receiver 240 for thermal treatment. The treated material emerges from receiver 240 through tubing 268 and is moved to storage or elsewhere for additional treatment.

Of course, the flexible reflective film may be incorporated into other types of lighting reflectors and solar energy applications, e.g., parabolic solar dish and heliostat applications. The flexible reflective film may be held in position by vacuum forces, adhesive, or by other means.

Understanding of the invention will be further enhanced by referring to the following illustrative but non-limiting examples.

EXAMPLE 1

A 50 micrometer co-extruded biaxially oriented flexible polyester film is obtained, the film consisting of (a) a 12 micrometer polyethylene terephthalate lamina containing conventional slip agents and hence having a mildly irregular surface to facilitate winding and (b) a 38 micrometer polyethylene terephthalate lamina containing no slip agent and hence having an exposed surface which is essentially optically smooth. The polyester is chosen based on its structural characteristics of strength and tear and impact resistance. On the smooth surface of the polyester film is then vapor-deposited approximately 1,000–1,500 nanometers (1.0–1.5 micrometers) of silver to provide an opaque specularly reflective metallic surface.

A UV stable adhesive, for example, a normally tacky and pressure-sensitive adhesive, e.g., acrylic or silicone, or a thermal-sensitive adhesive, e.g., acrylic, ethylene vinyl acetate (EVA), or epoxy, is dissolved in an organic solvent, e.g., methyl ethyl ketone (MEK). The adhesive is chosen based on its bonding properties, optical transmissiveness to light between 300–2,500 nanometers, and stability to ultraviolet light. Using reverse roll techniques, the adhesive dissolved in the solvent is applied to the surface of the silver distal to the polyester support sheet. The solvent evaporated by drying at about 100° C. in an oven for about 2–8 minutes to leave a dry coating, weighing approximately 14 g/m$^2$ (0.75 mil thick).

A 1 mil (0.025 millimeter) thick flexible fluorocarbon film is obtained, e.g., poly(vinyl fluoride), poly(tetrafluoroethylene), or poly(vinylidene fluoride), commercially available from DuPont under the trade designations "Tedlar," "Teflon," and "Kynar," respectively. The fluorocarbon film is chosen based on its optical transmissiveness to light between about 300–2,500 nanometers, its stability to ultraviolet light, its imperviousness to moisture, and its tensile strength and tear and impact resistance. The fluorocarbon film is applied using lamination techniques to the surface of the adhesive on the metal coated polyester support.

EXAMPLE 2

The flexible reflective film of Example 1, with the addition of UV absorber to the adhesive layer. The adhesive is dissolved in an organic solvent, e.g., methyl ethyl ketone (MEK). Also dissolved in the organic solvent is UV absorber effective in the 300–400 nanometer range; a presently preferred combination consists of equal amounts of 2-[2'-hydroxy-3',5'-di(alpha,alpha-dimethylbenzyl)phenyl]-benzotriazole and 2-(2'-hydroxy-3',5'-di-tertiaryamylphenylbenzotriazole, respectively available from CIBA-GEIGY Corp. under the trade designations "Tinuvin" 234 and "Tinuvin" 328. Approximately 5% of "Tinuvin" 234 UV absorber and 5% "Tinuvin" 328 UV absorber is added, all percentages based on the weight of dissolved adhesive. Using reverse roll techniques, the adhesive with corrosion inhibitor dissolved in the organic solvent is applied to the surface of the silver distal to the polyester support sheet. The solvent is evaporated by drying at about 100° C. in an oven for about 2–8 minutes to leave a dry coating, weighing approximately 14 g/m$^2$ (0.75 mil thick).

EXAMPLE 3

The flexible reflective film of Example 1, wherein the adhesive for bonding the fluorocarbon film to the surface of the silver is applied in two separate layers: the layer of adhesive that is bonded to the surface of the silver distal to the polyester support containing corrosion inhibitor, and the layer of adhesive that is bonded to the surface of the fluorocarbon film containing UV absorber.

Silver is more reflective to visible light than aluminum, but it is more susceptible to corrosion than aluminum. Therefore it is desirable to include corrosion inhibitors in the adhesive bonded to the silver. Silver is also characterized by the presence of a spectral window to ultraviolet light. This spectral window allows ultraviolet light reaching the surface of the silver to pass through the silver and degrade the polyester support. Therefore, it is desirable to provide a suitable medium for UV absorber interposed between the light source and the polyester. However, the UV absorbers tend to aggravate the corrosion of the silver if they contact the silver, and so the UV absorber should be placed in a layer physically separated from the silver.

A UV stable adhesive, for example, a normally tacky and pressure-sensitive adhesive, e.g., acrylic or silicone, or a thermal-sensitive adhesive, e.g., acrylic, ethylene vinyl acetate (EVA), or epoxy, is dissolved in an organic solvent, e.g., methyl ethyl ketone (MEK). The adhesive is chosen based on its bonding properties, optical transmissiveness to light between about 300–2,500 nanometers, and stability to ultraviolet light. Also dissolved in the organic solvent is a mercaptide-type sulfur corrosion inhibitor, e.g., glycol dimercaptoacetate at approximately 0.5–2.5% the weight of the adhesive, as disclosed in U.S. Pat. No. 4,645,714 and incorporated herein by reference. Using reverse roll techniques, the adhesive with corrosion inhibitor dissolved in the organic solvent is applied to the surface of the silver distal to the polyester support sheet. The solvent is evaporated by drying at about 100° C. in an oven for about 2–8 minutes to leave a dry coating, weighing approximately 2.5 g/m$^2$ (0.15 mil thick).

The corrosion inhibitor should bond with a substantial portion of the surface silver atoms. Furthermore, the corrosion inhibitor should promote adhesion, measured by the spreading drop technique disclosed in U.S. Pat. No. 4,338,377, as modified in U.S. Pat. No. 4,645,714, and incorporated herein by reference. Useful stable mercaptide-type sulfer for promoting adhesion will show a spreading drop area in excess of 6 mm$^2$, and preferably greater than 8 mm$^2$.

A UV stable adhesive, for example, a normally tacky and pressure-sensitive adhesive, e.g., acrylic or silicone, or a thermal-sensitive adhesive, e.g., acrylic, ethylene vinyl acetate (EVA), or epoxy, is dissolved in an organic solvent, e.g., methyl ethyl ketone (MEK). The adhesive is chosen based on its bonding properties, optical transmissiveness to light between about 300–2,500 nanometers, and stability to ultraviolet light. Also dissolved in the organic solvent is UV absorber effective in the 300–400 nanometer range; a presently preferred combination consists of equal amounts of 2-[2'-hydroxy-3',5'-di(alpha,alpha-dimethylbenzyl)-phenyl]-benzotriazole and 2-(2'-hydroxy-3',5'-ditertiaryamylphenylbenzotriazole, respectively available from CIBA-GEIGY Corp. under the trade designations "Tinuvin" 234 and "Tinuvin" 328. Approximately 5% of "Tinuvin" 234 UV absorber and 5% "Tinuvin" 328 UV absorber is added, all percentages based on the weight of dissolved adhesive. Using reverse roll techniques, the adhesive with UV absorber dissolved in the organic solvent is applied to the fluorocarbon film. The solvent is evaporated by drying at about 100° C. in an oven for about 2–8 minutes to leave a dry coating, weighing approximately 10 g/m$^2$ (0.55 mil thick).

The fluorocarbon film with the adhesive containing UV absorber is applied using lamination techniques to the surface of the adhesive containing corrosion inhibitor on the silver coated polyester support.

EXAMPLE 4

The flexible reflective film of Example 3, except that the layer of adhesive containing corrosion inhibitor is substituted by a thin layer of acrylate paint containing corrosion inhibitor. The paint is an acrylate-methacrylate interpolymer formed from monomers consisting essentially of (a) about 50 to 70% methyl methacrylate, ethylmethacrylate, or both, and (b) correspondingly about 50 to 30% butyl acrylate, butyl methacrylate, and 2-ethyl hexyl acrylate, or any combination of the three. The acrylate paint is similarly dissolved into an organic solvent. To the acrylate paint in the organic solvent is added the corrosion inhibitor. Using reverse roll techniques, the acrylate paint containing corrosion inhibitor is applied to the surface of the silver distal to the polyester support sheet.

EXAMPLE 5

A 50 micrometer (2 mil) thick flexible fluorocarbon film, e.g., poly(vinyl fluoride), poly(tetrafluoroethylene), or poly(vinylidene fluoride), commercially available from DuPont under the trade designations "Tedlar," "Teflon," and "Kynar," respectively. The film may be co-extruded and biaxially oriented consisting of (a) a 12 micrometer fluorocarbon lamina containing conventional slip agents and hence having a mildly irregular surface to facilitate winding and (b) a 38 micrometer fluorocarbon lamina containing no slip agent and hence having an exposed surface which is essentially optically smooth. The film is chosen based on its structural characteristics of tensile strength and tear and impact resistance.

A UV stable adhesive, for example, a normally tacky and pressure-sensitive adhesive, e.g., acrylic or silicone, or a thermal-sensitive adhesive, e.g., acrylic, ethylene vinyl acetate (EVA), or epoxy, is dissolved in an organic solvent, e.g., methyl ethyl ketone. The adhesive is chosen based on its bonding properties, optical transmissiveness to light between about 300–2,500 nanometers, and stability to ultraviolet light. Using reverse roll techniques, the adhesive dissolved in the organic solvent is applied to the smooth surface of the fluorocarbon film. The solvent is evaporated by drying at about 100° C. in an oven for about 2–8 minutes to leave a dry coating, weighing approximately 10 g/m$^2$ (0.55 mil thick).

On the surface of the adhesive distal to the flexible support sheet of fluorocarbon film is then vapor-deposited approximately 1,000–1,500 nanometers (1.0–1.5 micrometers) of silver to provide an opaque specularly reflective metallic surface.

Another UV stable adhesive, for example, a normally tacky and pressure-sensitive adhesive, e.g., acrylic or silicone, or a thermal-sensitive adhesive, e.g., acrylic, ethylene vinyl acetate (EVA), or epoxy, is dissolved in an organic solvent, e.g., methyl ethyl ketone (MEK). The second adhesive may be the same or different from the first layer of adhesive. The second adhesive is chosen based on its bonding properties, optical transmissiveness to light between about 300–2,500 nanometers, and stability to ultraviolet light. Using reverse roll techniques, the second adhesive dissolved in the organic solvent is applied to the surface of the silver distal to the flexible support sheet of fluorocarbon film. The solvent is evaporated by drying at about 100° C. in an oven for about 2–8 minutes to leave a dry coating, weighing approximately 10 g/m$^2$ (0.55 mil thick).

Another 25 micrometer (1 mil) thick flexible fluorocarbon film is obtained, e.g., poly(vinyl fluoride), poly(tetrafluoroethylene), or poly(vinylidene fluoride), commercially available from DuPont under the trade designations "Tedlar," "Teflon," and "Kynar," respectively. The second flexible fluorocarbon film may be the same or different from the first fluorocarbon film used for the flexible support sheet. The second fluorocarbon film is chosen based on its optical transmissiveness to light between about 300–2,500 nanometers, its stability to ultraviolet light, its imperviousness to moisture, and its tensile strength and tear and impact resistance. The second fluorocarbon film is applied using lamination techniques to the surface of the adhesive on the silver distal to the first fluorocarbon film.

EXAMPLE 6

The flexible reflective films of Examples 1–4 wherein an additional protective fluorocarbon film is adherently applied to the surface of the flexible support sheet distal to the silver. The function of the two layers of fluorocarbon film is to sandwich the flexible reflective film so that the film is protected from corrosion and weathering from both surfaces.

A normally tacky and pressure-sensitive adhesive, e.g., acrylic or silicone, or a thermal-sensitive adhesive, e.g., acrylic, ethylene vinyl acetate (EVA), or epoxy, is dissolved in an organic solvent, e.g., methyl ethyl ketone (MEK). Using reverse roll techniques, the dissolved adhesive is applied to the surface of the flexible polyester support sheet. The solvent is then evaporated by drying at about 100° C. in an oven for about 2–8 minutes to leave a dry coating, weighing approximately 14 g/m$^2$ (0.75 mil thick). The adhesive may chosen based on its bonding properties and stability to ultraviolet light.

Another 25 micrometer (1 mil) thick flexible fluorocarbon film is obtained, e.g., poly(vinyl fluoride), poly(tetrafluoroethylene), or poly(vinylidene fluoride), commercially available from DuPont under the trade designations "Tedlar," "Teflon," and "Kynar," respectively. The second flexible fluorocarbon film may be the same or different from the first fluorocarbon film used to protect the reflective surface of the silver. The second fluorocarbon film is chosen based on its optical transmissiveness to light between about 300–2,500 nanometers, its stability to ultraviolet light, its imperviousness to moisture, and its tensile strength and tear and impact resistance. The second fluorocarbon film is applied using lamination techniques to the surface of the adhesive on the flexible support sheet distal to the silver and the first fluorocarbon film.

EXAMPLE 7

The flexible reflective films of Examples 1–6 wherein an additional layer of adhesive is applied to the surface of the flexible support sheet distal to the silver. The function of this layer of adhesive is to allow the flexible reflective film to be adherently bonded to support surfaces of solar energy and lighting reflector applications.

A normally tacky and pressure-sensitive adhesive, e.g., acrylic or silicone, or a thermal-sensitive adhesive, e.g., acrylic, ethylene vinyl acetate (EVA), or epoxy, is dissolved in an organic solvent, e.g., methyl ethyl ketone (MEK). Using reverse roll techniques, the dissolved adhesive is applied to the surface of the flexible polyester support sheet. The solvent is then evaporated by drying at about 100° C. in an oven for about 2–8 minutes to leave a dry coating, weighing approximately 14 g/m$^2$ (0.75 mil thick). The adhesive may chosen based on its bonding properties and stability to ultraviolet light.

The adhesive bonded to the flexible support sheet is protectively covered by a release liner, e.g., silicone coated polyester film, to afford protection during handling prior to installation.

EXAMPLE 8

The reflective films of Examples 1–7, with the additional element that the fluorocarbon film is covered by a premask film, e.g., polypropylene, to afford protection against handling prior to installation and during installation. The premask film should be on the order of 12 mil (0.3 mm) thick and is applied using lamination techniques.

Each of the flexible reflective films described in the examples can be incorporated into lighting reflector applications and solar energy applications, including solar dishes and heliostats. Having described the flexible reflective films including the present invention, many changes and modifications still within the scope and spirit of the teachings herein will occur to those skilled in the art and thus it is intended that this invention be limited only as set forth in the following claims.

What is claimed is:

1. A flexible reflective film comprising in combination:
    a flexible polymeric support sheet;
    a specularly reflective layer of silver overlaying the surface of the flexible polymeric support sheet, the layer of silver being at least partially reflective to at least a portion of the visible, ultraviolet, and near-infrared spectrum between about 300–2,500 nanometers;
    an adhesive overlaying the surface of the specularly reflective layer of silver opposite to the flexible polymeric support sheet, the adhesive being transparent to at least a portion of the visible, ultraviolet, and near-infrared spectrum between about 300–2,500 nanometers; and
    a fluorocarbon film overlaying and bonded to the surface of the adhesive opposite to the specularly reflective layer of silver, the fluorocarbon film being impervious to moisture, stable to ultraviolet light, and transparent to at least a portion of the visible, ultraviolet, and near-infrared spectrum between about 300–2,500 nanometers.

2. The flexible reflective film of claim 1 wherein the flexible polymeric support sheet is between about 25–75 micrometers thick.

3. The flexible reflective film of claim 1 wherein the flexible polymeric support sheet is a biaxially oriented co-extruded composite of polyethylene terephthalate (polyester) comprising:
    a first polyester lamina about 12 micrometers thick containing slip agents and hence having a mildly irregular surface to facilitate winding; and
    a second polyester lamina about 38 micrometers thick free from slip agents and hence having an optically smooth surface, the specularly reflective layer of silver overlaying the surface of the second polyester lamina opposite to the first polyester lamina.

4. The flexible reflective film of claim 1 wherein flexible polymeric support sheet is another layer of the fluorocarbon film.

5. The flexible reflective film of claim 1 wherein the specularly reflective layer of silver is about 1.0–1.5 micrometers thick.

6. The flexible reflective film of claim 1 wherein the adhesive is stable to ultraviolet light.

7. The flexible reflective film of claim 1 wherein the adhesive contains about 10 wt % UV absorber comprising approximately equal parts of 2-[2'-hydroxy-3',5'-di- (alpha,alpha-dimethylbenzyl)phenyl]benzotriazole and 2-(2'-hydroxy-3',5'-ditertiaryamylphenylbenzotriazole.

8. The flexible reflective film of claim 1 wherein the fluorocarbon film is about 25-75 micrometers thick.

9. The flexible reflective film of claim 1 wherein the fluorocarbon film is a poly(vinyl fluoride).

10. The flexible reflective film of claim 1 wherein the fluorocarbon film is a poly(vinylidene fluoride).

11. The flexible reflective film of claim 1 wherein the fluorocarbon film is a poly(tetrafluoroethylene).

12. The flexible reflective film of claim 1 wherein another layer of the fluorocarbon film is bonded with another layer of the adhesive to the surface of the flexible polymeric support sheet opposite to the specularly reflective layer of silver.

13. The reflective film of claim 1 wherein a premask film overlays the surface of the fluorocarbon film opposite to the specularly reflective layer of silver.

14. The flexible reflective film of claim 1 wherein a layer of an adhesive overlays the flexible polymeric support sheet opposite to the specularly reflective layer of silver so that the flexible reflective film may be bonded to the surface of a structure for reflecting light.

15. The flexible reflective film of claim 14 wherein a release liner overlays the surface of the adhesive opposite to the flexible polymeric support sheet.

16. The flexible reflective film of claim 1 wherein a suitable medium containing a corrosion inhibitor is applied to the immediate surface of the specularly reflective layer of silver opposite to the flexible polymeric support sheet, the suitable medium containing a corrosion inhibitor being transparent to at least a portion of the visible, ultraviolet, and near-infrared spectrum between about 300-2,500 nonometers.

17. The flexible reflective film of claim 16 wherein the corrosion inhibitor consists essentially of a sufficient quantity of mercaptide-type sulfur to bond with a substantial fraction of the available silver atoms when applied at the immediate surface of the silver.

18. The flexible reflective film of claim 16 wherein the suitable medium for the corrosion inhibitor is a layer of the adhesive.

19. The flexible reflective film of claim 16 wherein the suitable medium for the corrosion inhibitor consists essentially of an acrylate paint.

20. A reflector comprising in combination:
a flexible polymeric support sheet;
a specularly reflective layer of silver overlaying the surface of the flexible polymeric support sheet, the layer of silver being at least partially reflective to at least a portion of the visible, ultraviolet, and near-infrared spectrum between about 300-2,500 nonometers;
an adhesive overlaying the surface of the specularly reflective layer of silver opposite to the flexible polymeric support sheet, the adhesive being transparent to at least a portion of the visible, ultraviolet, and near-infrared spectrum between about 300-2,500 nonometers;
a fluorocarbon film overlaying and bonded to the surface of the adhesive opposite to the specularly reflective layer of silver, the fluorocarbon film being impervious to moisture, stable to ultraviolet light, and transparent to at least a portion of the visible, ultraviolet, and near-infrared spectrum between about 300-2,500 nanometers; and
a means for attaching the flexible reflective film to a structure for reflecting light.

21. The reflector of claim 20 wherein the means for attaching the flexible reflective film to the surface of the structure for reflecting light is bonding with an adhesive the flexible reflective film to the surface of the structure for reflecting light.

22. The reflector of claim 20 wherein the means for attaching the flexible reflective film to the structure for reflecting light is holding with a vacuum the flexible reflective film in the desired position in the structure for reflecting light.

23. The reflector of claim 20 wherein the reflective surface of the structure for reflecting light is planar.

24. The reflector of claim 20 wherein the reflective surface of the structure for reflecting light is angular.

25. The reflector of claim 20 wherein the reflective surface of the structure for reflecting light is curved.

26. The reflector of claim 20 wherein the reflective surface of the structure for reflecting light is parabolic.

* * * * *

UNITED STATES PATENT AND TRADEMARK OFFICE
CERTIFICATE OF CORRECTION

PATENT NO. : 5,118,540
DATED : June 2, 1992
INVENTOR(S) : Joseph A. Hutchison It is certified that error appears in the above-identified patent and that said Letters Patent is hereby corrected as shown below:

In Column 3, line 56, change "an" to -- and --.

In Column 3, line 65, change "ar" to -- are --.

In Column 5, line 59, change "Of" to -- of --.

In Column 12, line 67, change "wt %" to -- wt% --.

Signed and Sealed this

Thirteenth Day of July, 1993

Attest:

MICHAEL K. KIRK

*Attesting Officer*     *Acting Commissioner of Patents and Trademarks*